(12) United States Patent
Oezdemir et al.

(10) Patent No.: US 9,705,971 B2
(45) Date of Patent: Jul. 11, 2017

(54) TRANSFERRING DIGITAL DATA TO AND FROM MOBILE CLIENT DEVICES (71) Applicant: TOYOTA JIDOSHA KABUSHIKI KAISHA, Toyota-shi, Aichi-ken (JP)

(72) Inventors: Ugur Oezdemir, Saratoga, CA (US); Vinuth Rai, San Jose, CA (US)

(*) Notice: Subject to any disclaimer, the term of this patent is extended or adjusted under 35 U.S.C. 154(b) by 319 days.

(21) Appl. No.: 14/506,891

(22) Filed: Oct. 6, 2014

(65) Prior Publication Data

US 2016/0099876 A1   Apr. 7, 2016

(51) Int. Cl.
| | |
|---|---|
| G06F 15/16 | (2006.01) |
| H04L 29/08 | (2006.01) |
| H04W 28/02 | (2009.01) |
| H04W 4/04 | (2009.01) |
| H04W 4/20 | (2009.01) |
| H04L 12/26 | (2006.01) |

(52) U.S. Cl.
CPC ............ *H04L 67/10* (2013.01); *H04W 4/046* (2013.01); *H04W 4/206* (2013.01); *H04W 28/0215* (2013.01); *H04L 43/0817* (2013.01); *H04L 43/0888* (2013.01); *H04L 43/0894* (2013.01)

(58) Field of Classification Search
CPC . H04L 67/10; H04L 43/0888; H04L 43/0894; H04L 43/0817; H04W 28/0215; H04W 4/206; H04W 4/046
See application file for complete search history.

(56) References Cited

U.S. PATENT DOCUMENTS

| 2005/0108075 | A1* | 5/2005 | Douglis | G06F 1/3203 705/80 |
| 2010/0304794 | A1* | 12/2010 | Beninghaus | H04W 52/028 455/574 |
| 2011/0112717 | A1* | 5/2011 | Resner | G07C 5/008 701/31.4 |
| 2011/0176482 | A1* | 7/2011 | Vizor | H04L 12/5695 370/328 |
| 2013/0114485 | A1* | 5/2013 | Vannithamby | H04W 28/06 370/311 |
| 2013/0191541 | A1* | 7/2013 | Kishan | G06F 9/5011 709/226 |
| 2013/0196621 | A1* | 8/2013 | Guday | H04W 24/02 455/406 |
| 2013/0244666 | A1* | 9/2013 | Carmon | H04W 52/0261 455/438 |

(Continued)

*Primary Examiner* — Philip Chea
*Assistant Examiner* — Mohammed Ahmed
(74) *Attorney, Agent, or Firm* — Burbage Law, P.C.; Jon-Michael Burbage; Elizabeth Ruzich (57) ABSTRACT

The disclosure includes a system and method for communicating digital data to a mobile client device. The system includes a processor and a memory storing instructions that, when executed, cause the system to: determine an operation state of a mobile client device; determine digital data to transmit to the mobile client device based on the operation state; determine a location associated with the mobile client device; determine a data transfer capacity associated with the mobile client device at the location; determine a data consumption rate associated with the mobile client device; determine a data transfer rate for the mobile client device based on the data transfer capacity and the data consumption rate; and transfer the digital data to the mobile client device based on the operation state and the data transfer rate.

14 Claims, 7 Drawing Sheets

(56) References Cited

U.S. PATENT DOCUMENTS

2014/0038656 A1\* 2/2014 Navda .................. H04W 24/10
 455/509
2014/0277828 A1\* 9/2014 Bullister ................ G07C 5/008
 701/1

\* cited by examiner

TRANSFERRING DIGITAL DATA TO AND FROM MOBILE CLIENT DEVICES

BACKGROUND

The disclosure relates to transferring digital data to and from mobile client devices. In particular, the disclosure relates to transferring digital data to and from mobile client devices based on operation states of the mobile client devices.

In-vehicle services such as navigation service and infotainment service may be improved over time by updating the services using digital data transferred from other devices or servers to the vehicles. For example, digital data may be transmitted to a vehicle and used to update services in the vehicle. However, the transmission of the digital data to the vehicle may be a challenge. For example, when ignition of the vehicle is turned off, the transmission of the digital data may drain the vehicle's battery, causing a failure to start the vehicle. In another example, the transmission of the digital data may interfere with and may be disruptive to other higher priority communications to the vehicle.

SUMMARY

According to one innovative aspect of the subject matter described in this disclosure, a system for communicating digital data to and from a mobile client device includes one or more processors and one or more non-transitory tangible computer readable mediums communicatively coupled to the one or more processors and storing executable instructions executable by the one or more processors to perform operations including: determining an operation state of a mobile client device; determining digital data to transmit to the mobile client device based on the operation state; determining a location associated with the mobile client device; determining a data transfer capacity associated with the mobile client device at the location; determining a data consumption rate associated with the mobile client device; determining a data transfer rate for the mobile client device based on the data transfer capacity and the data consumption rate; and transferring the digital data to the mobile client device based on the operation state and the data transfer rate.

In general, another innovative aspect of the subject matter described in this disclosure may be embodied in methods that include: determining an operation state of a mobile client device; determining digital data to transmit to the mobile client device based on the operation state; determining a location associated with the mobile client device; determining a data transfer capacity associated with the mobile client device at the location; determining a data consumption rate associated with the mobile client device; determining a data transfer rate for the mobile client device based on the data transfer capacity and the data consumption rate; and transferring the digital data to the mobile client device based on the operation state and the data transfer rate.

Other aspects include corresponding methods, systems, apparatus, and computer program products for these and other innovative aspects.

These and other implementations may each optionally include one or more of the following operations and features. For instance, the features include: the operation state including a battery-restricted state; the operation state including a normal operation state; and the data consumption rate including a total data rate consumed by one or more applications that are currently launched on the mobile client device. For instance, the operations include: determining a battery level associated with the mobile client device; the digital data being transferred to the mobile client device based on the data transfer rate and the battery level to prevent battery depletion in the mobile client device; applying the digital data to update one or more applications related to the digital data in background in the normal operation state of the mobile client device; detecting an ignition-off event; applying the digital data to update one or more applications related to the digital data responsive to the ignition-off event; detecting an ignition-on event; and launching the one or more updated applications responsive to the ignition-on event.

The disclosure is particularly advantageous in a number of respects. First, the system described herein may transfer digital data to a vehicle and may update in-vehicle applications relevant to the digital data in background without distracting a driver of the vehicle. The pushing of the digital data to the vehicle may not degrade performance of other applications that are currently running on the vehicle. For example, the pushing of the digital data may not spoil the driver's enjoyment of Internet radio. Second, the system may provide a battery management scheme to manage a battery level in the vehicle when the vehicle is in a battery-restricted state such as an ignition-off state. For example, the system may transfer the digital data to the vehicle based on the battery level of the vehicle to prevent battery depletion. The battery level may not drop blow a predetermined threshold so that the battery maintains sufficient power for reliably restarting the vehicle. The advantages of the system described herein are provided by way of example, and the system may have numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

System Overview

Figure 1:
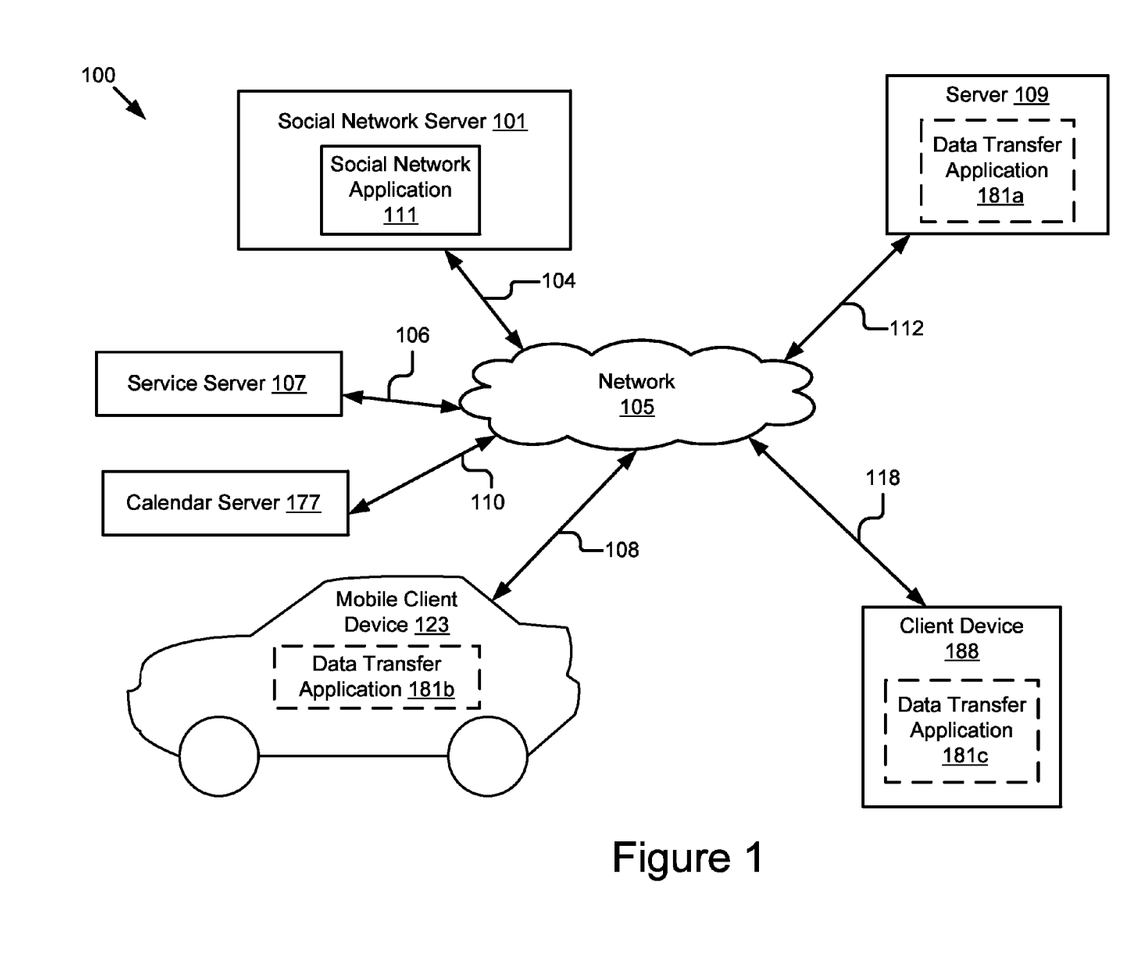
FIG. 1 is a block diagram illustrating an example system for data transfer to and from a mobile client device according to some implementations.

FIG. 1 illustrates a block diagram of some implementations of a system 100 for data transfer to and from a mobile client device. The system 100 includes a social network server 101, a server 109, a client device 188, a mobile client device 123, a calendar server 177, and a service server 107. The system 100 may include other servers or devices not shown in FIG. 1 including, for example, a traffic server for providing traffic data, a weather server for providing weather data, and a map server for providing map data, etc.

In some implementations, these entities of the system 100 may be communicatively coupled via a network 105. For example, the social network server 101 may be communicatively coupled to the network 105 via a signal line 104.

The server 109 may be communicatively coupled to the network 105 via a signal line 112. The client device 188 may be communicatively coupled to the network 105 via a signal line 118. The mobile client device 123 may be communicatively coupled to the network 105 via a signal line 108. The calendar server 177 may be communicatively coupled to the network 105 via a signal line 110. The service server 107 may be communicatively coupled to the network 105 via a signal line 106.

While FIG. 1 illustrates one social network server 101, one server 109, one client device 188, one mobile client device 123, one calendar server 177, and one service server 107, the disclosure applies to a system architecture including one or more social network servers 101, one or more servers 109, one or more client devices 188, one or more mobile client devices 123, one or more calendar servers 177, and one or more service servers 107. Furthermore, although FIG. 1 illustrates one network 105 coupled to the entities of the system 100, in practice one or more networks 105 can be connected to these entities.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some implementations, the network 105 may include a global positioning system (GPS) satellite for providing GPS navigation to the client device 188 and the mobile client device 123. The network 105 may be a mobile data network such as third-generation (3G), fourth-generation (4G), long-term evolution (LTE), Voice-over-LTE ("VoLTE") or any other mobile data network or combination of mobile data networks.

In some implementations, a data transfer application 181a may be operable on the server 109. The server 109 can be a hardware server that includes a processor, a memory, and network communication capabilities. The server 109 may send and receive data to and from other entities of the system 100 via the network 105. For example, the server 109 receives new journey data associated with a user from the mobile client device 123 and stores the new journey data in a storage device associated with the server 109. In another example, the server 109 sends historical journey data associated with a user to the mobile client device 123.

Alternatively or additionally, a data transfer application 181b may be operable on the mobile client device 123. The mobile client device 123 may include a mobile communication node. For example, the mobile client device 123 may be a vehicle (e.g., an automobile, a bus, an airplane, a boat), a bionic implant, or any other mobile system. In some implementations, the mobile client device 123 may include a computing device that includes a memory and a processor. A user may interact with the mobile client device 123.

In some implementations, the mobile client device 123 may include one or more sensors (not shown), such as a navigation sensor (e.g., a GPS sensor), an infrared detector, a motion detector, a thermostat, a sound detector, and any other type of sensors. For example, the mobile client device 123 may include sensors for measuring one or more of a current time, a current location (e.g., a latitude, longitude, and altitude of a location), an acceleration of a vehicle, a velocity of a vehicle, a fuel tank level, and a battery level of a vehicle, etc.

Alternatively or additionally, a data transfer application 181c may be operable on the client device 188. The client device 188 may be a computing device that includes a memory and a processor, for example, a laptop computer, a desktop computer, a tablet computer, a mobile telephone, a personal digital assistant ("PDA"), a mobile e-mail device, a portable game player, a portable music player, a television with one or more processors embedded therein or coupled thereto, or other electronic device capable of accessing the network 105. A user may interact with the client device 188.

The data transfer applications 181a, 181b, and 181c may be individually and collectively referred to as a data transfer application 181. The data transfer application 181 may include code and routines for transferring digital data to and from the mobile client device 123. In some implementations, the data transfer application 181 can be implemented using hardware including a field-programmable gate array ("FPGA") or an application-specific integrated circuit ("ASIC"). In some other implementations, the data transfer application 181 can be implemented using a combination of hardware and software. The data transfer application 181 may be stored in a combination of the devices and servers, or in one of the devices or servers. The data transfer application 181 is described below in more detail with reference to FIGS. 2-4D.

Throughout the disclosure, the term "digital data" may be used to represent any digital data undergoing the transfer operations described herein. The digital data may include, but is not limited to, update data used to update services in the mobile client device 123 (e.g., software update data for updating software applications installed in a vehicle, navigation updates, infotainment updates), content data describing content updates subscribed by a user (e.g., latest movies, music, podcasts, etc.), and any other digital data to be transferred to the mobile client device 123. In some implementations, the digital data may include mobile system data associated with the mobile client device 123, and the digital data may be transferred from the mobile client device 123 to the server 109.

The social network server 101 can be a hardware server that includes a processor, a memory, and network communication capabilities. The social network server 101 sends and receives data to and from other entities of the system 100 via the network 105. The social network server 101 includes a social network application 111. A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related.

The social network server 101 and the social network application 111 can be representative of one social network and that there may be multiple social networks coupled to the network 105, each having its own server, application, and social graph. For example, a first social network may be more directed to business networking, a second may be more directed to or centered on academics, a third may be more directed to local business, a fourth may be directed to dating, and others may be of general interest or a specific focus.

The service server 107 can be a hardware server that includes a processor, a memory, and network communication capabilities. The service server 107 may send and receive data to and from other entities of the system 100 via the network 105. In some implementations, the service server 107 may provide various services to the mobile client device 123. For example, the service server 107 may provide one or more of navigation service, infotainment service, and software update service to the mobile client device 123. In some implementations, the service server 107 sends digital data (e.g., navigation updates, infotainment updates, software updates, advertisement updates, etc.) to the mobile client device 123 via the network 105.

The calendar server 177 can be a hardware server that includes a processor, a memory, and network communication capabilities. The calendar server 177 sends and receives data to and from other entities of the system 100 via the network 105. For example, the calendar server 177 sends data describing a user's calendar to the mobile client device 123 with permission from the user.

Example Data Transfer Application

Figure 2:
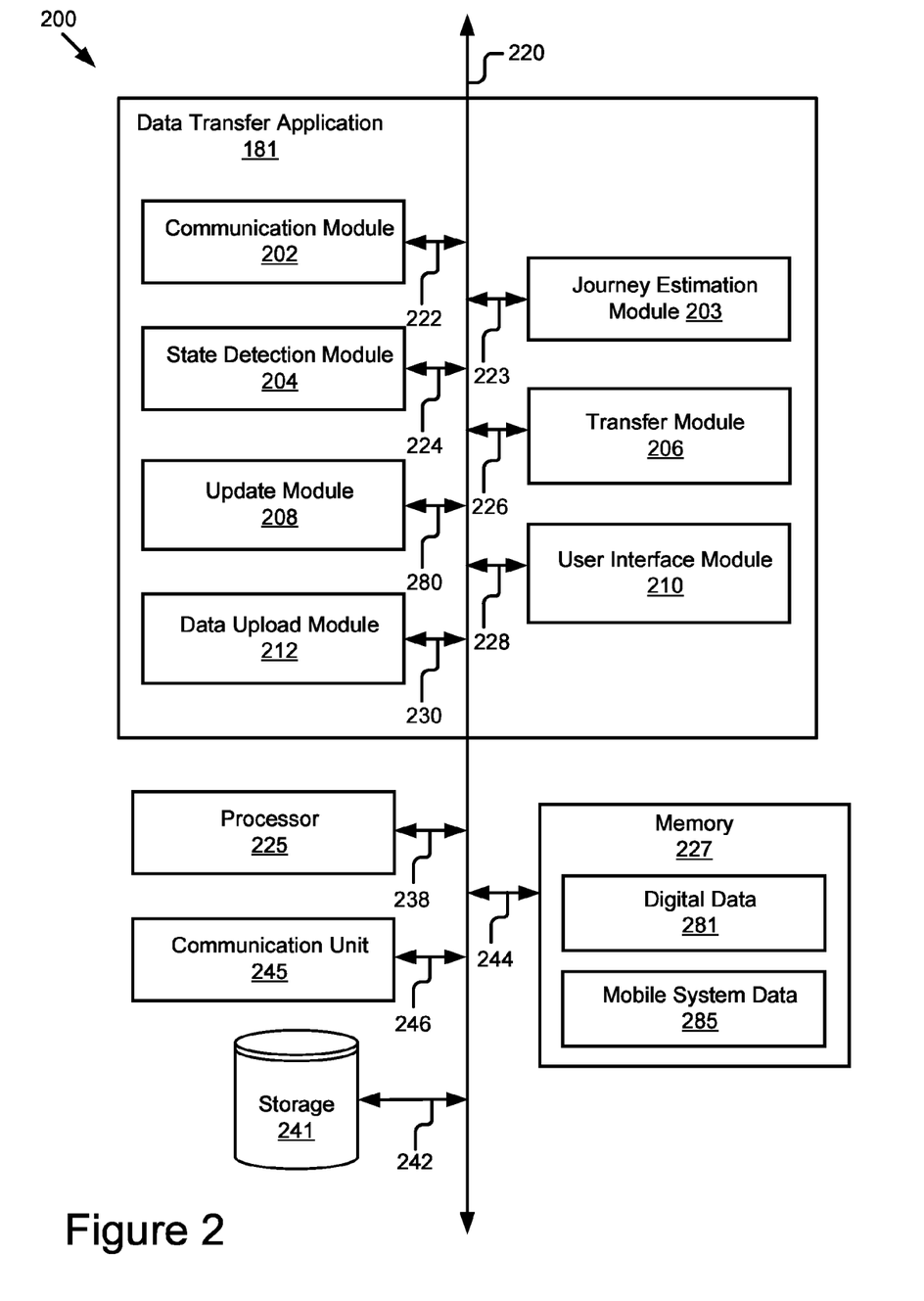
FIG. 2 is a block diagram illustrating an example computing device that includes an example data transfer application according to some implementations.

Referring now to FIG. 2, an example of the data transfer application 181 is shown in more detail. FIG. 2 is a block diagram of a computing device 200 that includes the data transfer application 181, a processor 225, a communication unit 245, a storage 241, and a memory 227 according to some examples. The components of the computing device 200 are communicatively coupled by a bus 220. The computing device 200 may be one of the server 109, the client device 188, the mobile client device 123, and any other entity of the system 100.

The processor 225 includes an arithmetic logic unit, a microprocessor, a general-purpose controller, or some other processor array to perform computations and provide electronic display signals to a display device. The processor 225 is coupled to the bus 220 for communication with the other components via a signal line 238. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors 225 may be included. Other processors, operating systems, sensors, displays, and physical configurations may be possible.

The memory 227 stores instructions or data that may be executed by the processor 225. The memory 227 is coupled to the bus 220 for communication with the other components via a signal line 244. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores digital data 281 and mobile system data 285. The memory 227 may also store other data for providing the functionality described herein. The digital data 281 may include, but is not limited to, update data describing updates for the mobile client device 123, data to be shared with the mobile client device 123, and data to be transferred to the mobile client device 123. For example, the digital data 281 includes one or more of software program updates, navigation updates (e.g., map updates), traffic updates, road information updates (e.g., road construction updates), and infotainment updates (e.g., music updates, podcast updates, video updates, advertisement updates including deals, coupons, and restaurant recommendations). Other example digital data 281 is possible.

The mobile system data 285 may include data associated with the mobile client device 123. For example, the mobile system data 285 includes an identifier identifying the mobile client device 123 (e.g., a vehicle identification number), one or more user identifiers identifying one or more users associated with the mobile client device 123 (e.g., a driver in a vehicle, a passenger in the vehicle), and historical journey data associated with the mobile client device 123 (e.g., start points, destinations, durations, routes associated with historical journeys). In some implementations, the mobile client device 123 may include a vehicle, and the mobile system data 285 may include vehicle data associated with the vehicle.

The communication unit 245 transmits and receives data to and from at least one of the mobile client device 123, the client device 188, and other servers 101, 107, 109, 177 in the system 100. The communication unit 245 is coupled to the bus 220 via a signal line 246. In some implementations, the communication unit 245 includes a port for direct physical connection to the network 105 or to another communication channel. For example, the communication unit 245 includes a USB, SD, CAT-5, or similar port for wired communication with other entities in the system 100. In some implementations, the communication unit 245 includes a wireless transceiver for exchanging data with other entities in the system 100 or other communication channels using one or more wireless communication methods, including IEEE 802.11, IEEE 802.16, Bluetooth®, or another suitable wireless communication method.

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, etc.

The storage 241 can be a non-transitory storage medium that stores data for providing the functionality described herein. The storage 241 may be a dynamic random access memory (DRAM) device, a static random access memory (SRAM) device, flash memory, or some other memory devices. In some implementations, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated implementation shown in FIG. 2, the data transfer application 181 includes a communication module 202, a journey estimation module 203, a state detection module 204, a transfer module 206, an update module 208, a user interface module 210, and a data upload module 212. These modules of the data transfer application 181 are communicatively coupled to each other via the bus 220. For simplicity and illustration purposes only, the functionality of the various modules in the data transfer application 181 are described below with reference to a vehicle, which is an example of the mobile client device 123. The description also applies to other example mobile client devices.

In some implementations, modules of the data transfer application 181 can be stored in a single server or device. In some other implementations, modules of the data transfer application 181 can be distributed and stored across multiple servers or devices. Furthermore, the separation of various components, modules, and servers in the implementations described herein should not be understood as requiring such separation in all implementations. In some implementations, the described components, modules, devices, or servers can generally be integrated together in a single component, module, device, or server.

In some implementations, each of the modules 202, 203, 204, 206, 208, 210, and 212 in the data transfer application 181 can be a set of instructions executable by the processor 225 to provide the functionality described below. In some other implementations, each of the modules 202, 203, 204, 206, 208, 210, and 212 can be stored in the memory 227 of the computing device 200 and can be accessible and executable by the processor 225. Each of the modules 202, 203, 204, 206, 208, 210, and 212 may be adapted for cooperation and communication with the processor 225 and other components of the computing device 200.

The communication module 202 can be software including routines for handling communications between the data transfer application 181 and other components of the computing device 200. The communication module 202 may be communicatively coupled to the bus 220 via a signal line 222. The communication module 202 sends and receives data, via the communication unit 245, to and from one or more of the mobile client device 123, the client device 188, the social network server 101, the server 109, the service server 107, and the calendar server 177. For example, the communication module 202 receives, via the communication unit 245, social network data from the social network server 101 and sends the social network data to the journey estimation module 203.

In some implementations, the communication module 202 receives data from components of the data transfer application 181 and stores the data in one or more of the storage 241 and the memory 227. In some implementations, the communication module 202 retrieves data from the storage 241 or the memory 227 and sends the data to one or more components of the data transfer application 181. In some implementations, the communication module 202 may handle communications between components of the data transfer application 181. For example, the communication module 202 receives journey context data from the journey estimation module 203 and sends the journey context data to the transfer module 206.

The journey estimation module 203 can be software including routines for estimating a future journey for a user. The journey estimation module 203 may be communicatively coupled to the bus 220 via a signal line 223. In some implementations, the journey estimation module 203 receives historical journey data associated with a vehicle or a user operating the vehicle from the memory 227, the storage 241, or the server 109. The user may be a driver or a passenger of the vehicle. The journey estimation module 203 estimates a future journey for the vehicle based on the historical journey data. For example, the journey estimation module 203 estimates journey context data describing the estimated future journey based on the historical journey data. In a further example, if the historical journey data indicates that the user usually leaves home and drives the vehicle to work between 8:00 AM and 8:30 AM on weekdays, the journey estimation module 203 estimates a future journey for the vehicle as a journey departing from home to work with a departure time of 8:00 AM in a next weekday morning.

In some implementations, the journey context data includes a start point, a destination, a departure time, a route, a duration, and an arrival time at the destination, etc. The journey context data may include other data associated with the future journey such as one or more users estimated to participate in the future journey (e.g., a driver and one or more passengers potentially engaging in the future journey) and a purpose or a goal of the future journey (e.g., picking up a person from an airport, a vacation trip, a trip for shopping, etc.). In some implementations, at least part of the journey context data is not obtained from estimation. For example, a user may manually input journey context data for a future journey including, but not limited to, a departure time, a destination, one or more participants in the future journey, etc. Other example journey context data is possible.

In some implementations, the journey estimation module 203 receives time synchronicity data from the memory 227 or from a GPS sensor in the vehicle or the client device 188. The journey estimation module 203 determines a synchronized local time associated with the vehicle based on the time synchronicity data. The journey estimation module 203 receives one or more of weather data from a weather server (not shown), calendar data from the calendar server 177, and social network data from the social network server 101. The journey estimation module 203 estimates a future journey for the vehicle based on one or more of the synchronized local time, the weather data, the calendar data, and the social network data. The journey estimation module 203 generates journey context data describing the estimated future journey. For example, if the calendar data indicates that the user has a doctor appointment at 9:00 AM in the next morning and a travel time from home to the doctor's office is less than half an hour, the journey estimation module 203 may estimate a future journey for the user as a journey from home to the doctor's office with an estimated departure time of 8:30 AM in the next morning.

The time synchronicity data can be data used to synchronize a device time with a universal time. For example, the time synchronicity data can be configured to synchronize a local time associated with a vehicle or a mobile client device with a universal time. In some implementations, a local time may be synchronized with the Coordinated Universal Time (UTC) defined by International Telecommunications Union Recommendation (ITU-R TF.460-6) according to a corresponding local time zone. In some other implementations, a local time may be synchronized by timekeeping technologies including GPS satellites and a network time protocol (NTP). The network time protocol may include a networking protocol for clock synchronization between computer systems over packet-switched variable-latency data networks.

In some implementations, the journey estimation module 203 sends the journey context data describing the future journey to one or more of the transfer module 206 and the update module 208. In some other implementations, the journey estimation module 203 stores the journey context data in the storage 241 or the memory 227.

The state detection module 204 can be software including routines for detecting an operation state of the vehicle. The state detection module 204 may be communicatively coupled to the bus 220 via a signal line 224. In some implementations, the state detection module 204 receives sensor data from one or more sensors associated with the vehicle and determines an operation state of the vehicle based on the sensor data. An operation state of the vehicle may include a normal operation state or a battery-restricted state.

During the normal operation state, there may be no restriction imposed on battery usage in the vehicle. For example, the normal operation state may include an ignition-on state in which ignition of the vehicle is turned on and the battery may be recharged in real time or near real time.

During the battery-restricted state, one or more restrictions may be imposed on the battery usage in the vehicle. For example, a battery level of the battery may not be reduced below a predetermined threshold so that the battery may save sufficient power for restarting the vehicle upon a user request. The battery-restricted state may include an ignition-off state in which ignition of the vehicle is turned off. The state detection module 204 determines the battery level in the vehicle. Different battery management schemes may be applied to the vehicle depending on the battery level of the vehicle to prevent battery depletion. As a result, the battery may have sufficient power for reliably restarting the vehicle.

In some implementations, the state detection module 204 may send data describing the operation state of the vehicle (e.g., a normal operation state or a battery-restricted state and a related battery level) to the transfer module 206 and the update module 208. Alternatively or additionally, the state detection module 204 may store the data in the storage 241 or the memory 227.

The transfer module 206 can be software including routines for transferring digital data to the vehicle. The transfer module 206 may be communicatively coupled to the bus 220 via a signal line 226. In some implementations, the transfer module 206 receives journey context data describing a future journey from the journey estimation module 203, where the journey context data includes a start point, a destination, a route, a departure time, and an arrival time associated with the future journey. The transfer module 206 may receive data describing a current operation state of the vehicle from the state detection module 204. The transfer module 206 determines digital data for the vehicle based on one or more of the journey context data and the current operation state.

For example, assume that the journey context data indicates the user may take a journey to a particular destination in half an hour. The transfer module 206 determines: (1) navigation information for the future journey; (2) recent road construction information associated with the estimated route of the future journey; (3) software program updates for updating one or more software programs installed in the vehicle; (4) recommended restaurants along the estimated route; (5) deals and coupons for stores along the estimated route; and (6) entertainment content data customized for one or more users estimated to participate in the future journey, etc. If the current operation state of the vehicle is the normal operation state with no battery usage restriction, the transfer module 206 may determine the digital data to include: (1) the navigation information; (2) the recent road construction information; (3) the software program updates; (4) the recommended restaurants along the estimated route; (5) the deals and coupons for stores along the estimated route; and (6) the entertainment content data customized for one or more users estimated to participate in the future journey. However, if the current operation state of the vehicle is the battery-restricted state, the transfer module 206 may determine the battery level of the vehicle. The transfer module 206 may determine the digital data based on the battery level to avoid battery depletion. For example, if the battery level is 90% full, the digital data may include: (1) the navigation information; (2) the recent road construction information; and (3) the software program updates. If the battery level is 50% full, the digital data may include: (1) the navigation information; and (2) the recent road construction information.

The transfer module 206 determines a current location of the vehicle. The transfer module 206 may determine a wireless network available at the current location for transferring the digital data to the vehicle. In some implementations, multiple wireless networks may be available. The transfer module 206 may select a wireless network from the multiple wireless networks for the data transfer based on one or more of a velocity of the vehicle, connectivity of the wireless networks, data transfer costs related to the wireless networks, and an operation state of the vehicle (e.g., whether the vehicle is in the normal operation state or the battery-restricted state). For example, if the vehicle is in the battery-restricted state, the transfer module 206 may select a wireless network with a highest connectivity from the multiple wireless networks. The digital data may be transferred to the vehicle using the selected wireless network in a shorter time period to save power in the battery compared to other wireless networks. Alternatively, if the vehicle is in the normal operation state, the transfer module 206 may select a wireless network with a lowest data transfer cost compared to other wireless networks.

The transfer module 206 determines a data transfer capacity associated with the selected wireless network for the vehicle at the current location. The data transfer capacity may represent a maximal data transfer rate of the wireless network to transfer data to the vehicle at the current location. In some implementations, the transfer module 206 may determine the data transfer capacity based on a velocity of the vehicle and connectivity of the selected wireless network. The transfer module 206 may store the data transfer capacity along with the current location for fast lookups in future or for use by other vehicles that may pass by the current location. The transfer module 206 may determine a current data consumption rate associated with the vehicle. For example, assume that there are one or more applications running on the vehicle that consume data from the network 105. The transfer module 206 determines a current data consumption rate representing a total amount of network data that the one or more running applications download per second from the network 105.

The transfer module 206 determines a data transfer rate for transferring the digital data to the vehicle based on the data transfer capacity and the current data consumption rate. For example, the transfer module 206 may determine the data transfer rate to fit within the data transfer capacity under the current data consumption conditions (e.g., the data transfer rate≤the data transfer capacity—the current data consumption rate). The data transfer rate may be determined in a way such that the transfer of the digital data may be treated with a lower priority than transfer of the network data consumed by the one or more running applications. Operations of the one or more running applications may not be affected by the transfer of the digital data. For example, data flow of the one or more running applications may not be delayed due to the transfer of the digital data.

In some implementations, as the vehicle travels at a certain velocity, the transfer module 206 may periodically update a current location of the vehicle, a data transfer capacity at the updated current location of the vehicle, and a data consumption rate associated with the vehicle. The transfer module 206 may adjust the data transfer rate for transferring the digital data to the vehicle based on the updated data transfer capacity and the updated data consumption rate, so that transfer of the network data consumed by the one or more running applications may not be affected by the transfer of the digital data.

The transfer module 206 may retrieve the digital data from one or more servers (e.g., the service server 107). In some implementations, the vehicle may be in a normal operation state such as an ignition-on state. The transfer module 206 may transfer the digital data to the vehicle based on the data transfer rate. Alternatively, the vehicle may be in a battery-restricted state such as an ignition-off state. The transfer module 206 may determine a battery level of the vehicle and may transfer the digital data to the vehicle based on the data transfer rate and the battery level, so that the battery of the vehicle maintains a level not less than a predetermined threshold. The battery of the vehicle may not be drained below the predetermined threshold so that the battery maintains sufficient power for reliably restarting the vehicle.

The update module 208 can be software including routines for updating one or more applications relevant to the digital data. The update module 208 may be communicatively coupled to the bus 220 via a signal line 280. The update module 208 may determine whether the vehicle is ready to update. For example, the update module 208 may determine whether one or more relevant applications related to the digital data are ready to update. If the one or more relevant applications are not active (e.g., the one or more relevant applications are not currently launched on the vehicle), the update module 208 may update the one or more relevant applications in background without distracting a driver operating the vehicle and interfering with other applications that are currently launched on the vehicle. For example, assume that an Internet radio application is currently running on the vehicle while a navigation application is inactive. The update module 208 may update the navigation application in the vehicle using the digital data. The update of the navigation application may be performed in background without interfering with the Internet radio application that plays music.

If the one or more relevant applications are currently active (e.g., the one or more relevant applications currently launched in the vehicle), the one or more relevant applications may not be ready to update. For example, an Internet radio application may not be updated since the Internet radio application is currently launched in the vehicle. In this case, the update module 208 may update the one or more relevant applications when the one or more relevant applications are closed or an ignition-off event is detected. For example, the update module 208 may detect an ignition-off event indicating ignition of the vehicle is turned off. The update module 208 may apply the digital data to update the one or more relevant applications responsive to the ignition-off event. Afterwards, when the update module 208 detects an ignition-on event, the update module 208 may launch the one or more updated relevant applications responsive to a user request or the ignition-on event.

The user interface module 210 can be software including routines for generating graphical data for providing user interfaces. The user interface module 210 may be communicatively coupled to the bus 220 via a signal line 228. In some implementations, the user interface module 210 generates graphical data for providing a user interface that allows a user to input data via the user interface. The user interface module 210 sends the graphical data to a display coupled to the mobile client device 123 for presenting the user interface to the user. The user interface module 210 may generate graphical data for providing other user interfaces to the user.

The data upload module 212 can be software including routines for uploading mobile system data from the vehicle to other entities of the system 100 such as the server 109. The data upload module 212 may be communicatively coupled to the bus 220 via a signal line 230. In some implementations, the data upload module 212 determines whether there is new mobile system data (e.g., new vehicle data) in the vehicle. If there is new mobile system data in the vehicle, the data upload module 212 retrieves the new mobile system data from the vehicle and sends the new mobile system data to the server 109. The server 109 may store the new mobile system data in a storage device associated with the server 109.

Example mobile system data associated with a vehicle (or example vehicle data) includes, but is not limited to, charging configuration data for the vehicle, location data describing locations visited by the vehicle, a synchronized local time, and vehicle usage data describing historical usage of the vehicle (e.g., historical journey data including routes, start points, destinations, durations, departure times, arrival times, directions, etc. associated with historical journeys).

In some implementations, the transfer module 206 may use a selected wireless network to transfer the digital data to the vehicle. The data upload module 212 may determine a data upload capacity associated with the selected wireless network for the vehicle. The data upload capacity may indicate a maximal data upload speed for the vehicle using the selected wireless network. The data upload module 212 may determine a current application upload rate associated with the vehicle. The current application upload rate may indicate an aggregated data upload rate associated with one or more applications currently running on the vehicle. The data upload module 212 determines a digital data upload rate based on the data upload capacity and the current application upload rate (e.g., the digital data upload rate≤the data upload capacity—the current application upload rate). The upload of the mobile system data from the vehicle to other entities of the system 100 may not affect performance of the one or more applications running on the vehicle. For example, the upload of the mobile system data may have a lower priority than network data communication of the one or more running applications.

The data upload module 212 may upload the mobile system data to other entities of the system 100 using the selected wireless network based on the digital data upload rate and an operation state of the vehicle. For example, if the vehicle is in the normal operation state, the data upload module 212 may upload the mobile system data to the server 109 according to the digital data upload rate. If the vehicle is in the battery-restricted state, the data upload module 212 may upload the mobile system data to the server 109 in the same time period as the transfer module 206 transfers the digital data to the vehicle. When the transfer module 206 stops the transferring of the digital data, the data upload module 212 may also stop the upload of the mobile system data to save power in the battery. The data upload module 212 may continue to upload the mobile system data to the server 109 when the vehicle is in the normal operation state again. In some implementations, the data upload module 212 may not upload any mobile system data to the server 109 when the vehicle is in the battery-restricted state to save power in the battery.

Methods

Figure 3:
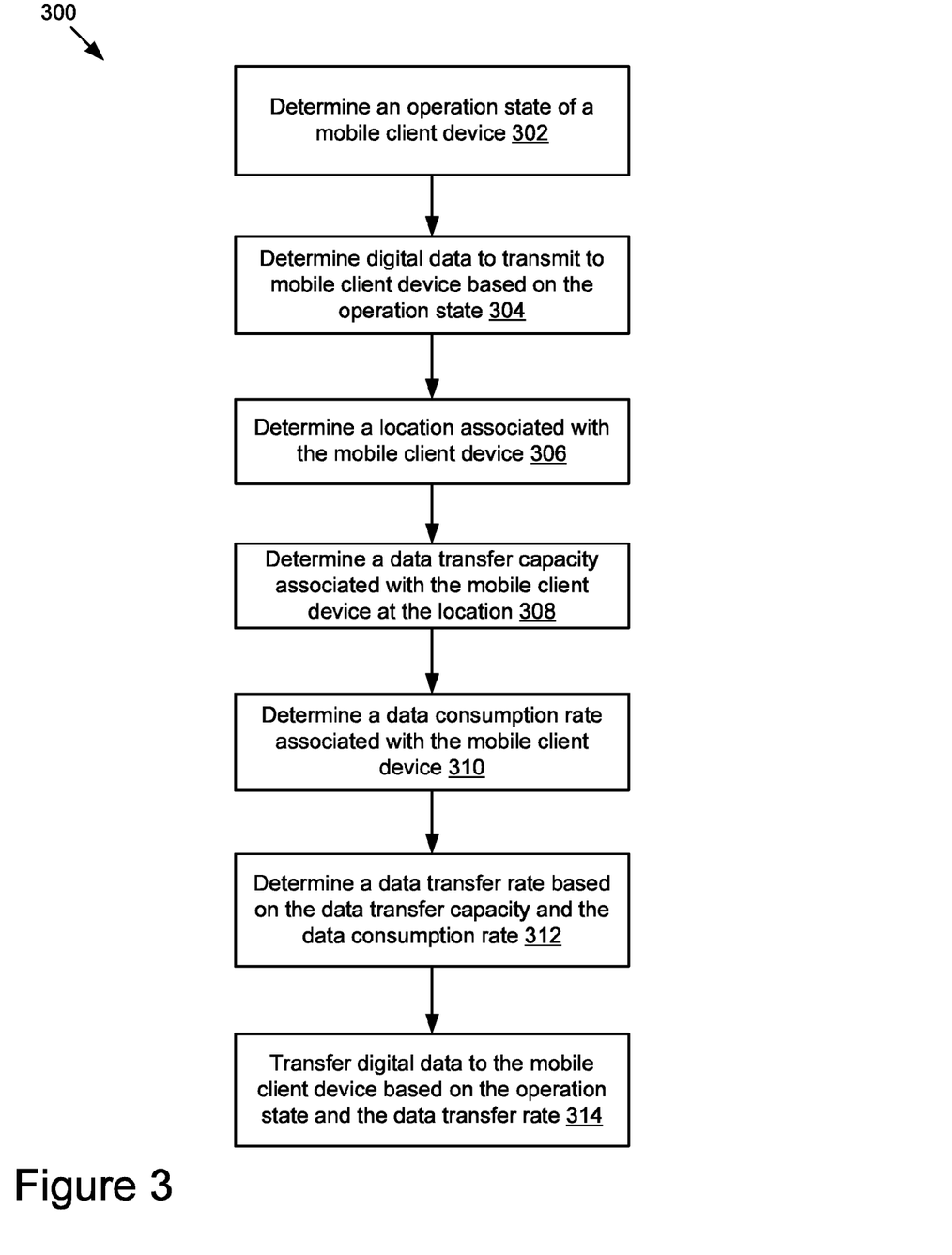
FIG. 3 is a flowchart of an example method for communicating digital data to a mobile client device according to some implementations.

Referring now to FIG. 3, an example of a method 300 for communicating digital data to the mobile client device 123 is described. The state detection module 204 determines 302 an operation state of the mobile client device 123. The transfer module 206 determines 304 digital data to transmit to the mobile client device 123 based on the operation state. The transfer module 206 determines 306 a location associated with the mobile client device 123. The transfer module 206 may select a wireless network for transferring the digital data to the vehicle. The transfer module 206 determines 308 a data transfer capacity associated with the selected wireless network for the mobile client device 123 at the location. The transfer module 206 determines 310 a data consumption rate associated with the mobile client device 123. The transfer module 206 determines 312 a data transfer rate for transferring the digital data to the mobile client device 123 based on the data transfer capacity and the data consumption rate. The transfer module 206 transfers 314 the digital data to the mobile client device 123 based on the operation state of the mobile client device 123 and the data transfer rate.

Figure 4A:
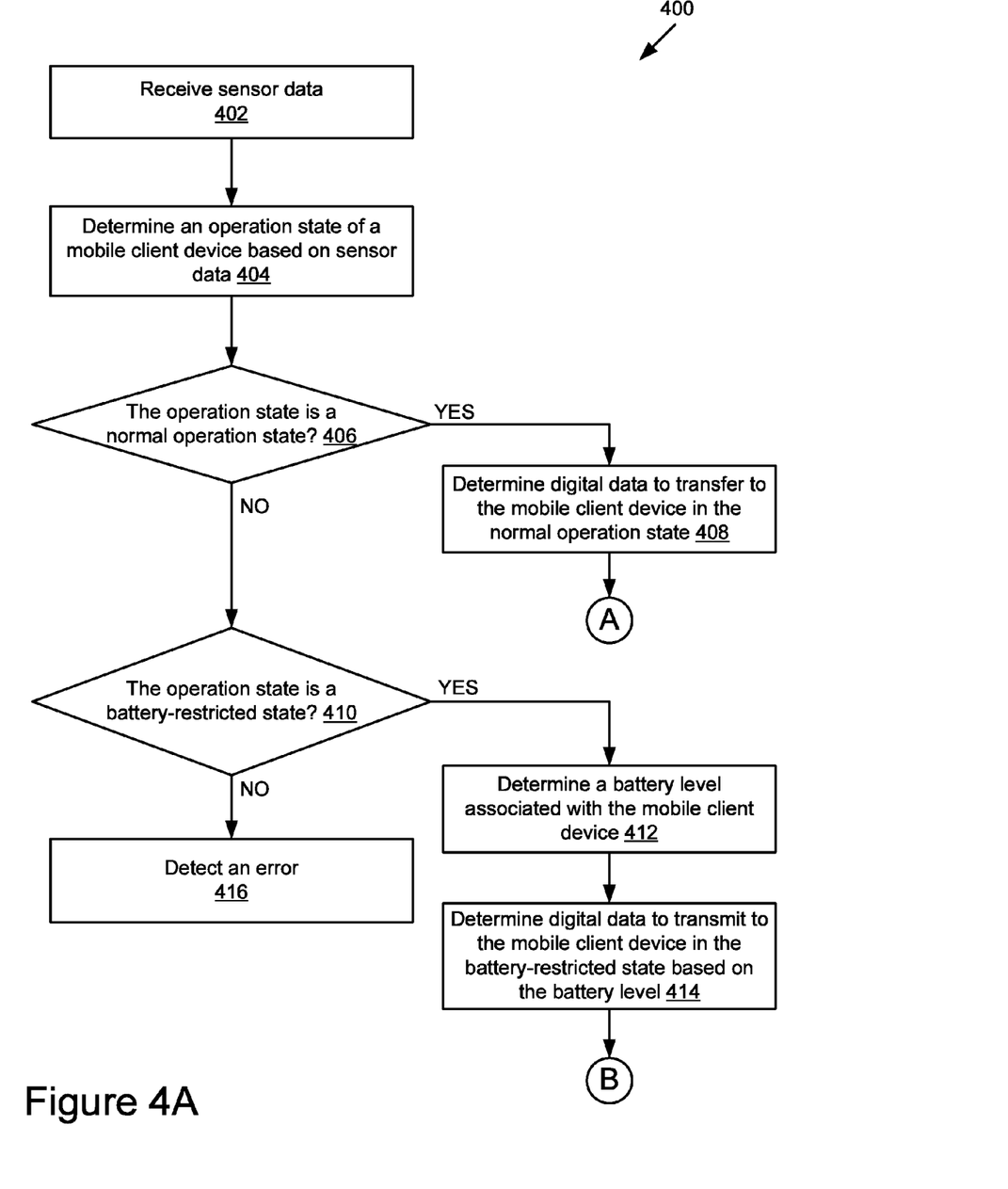
FIGS. 4A-4D are flowcharts of another example method for communicating digital data to a mobile client device according to some implementations.

FIGS. 4A-4D are flowcharts of another example method 400 for communicating digital data to the mobile client device 123 according to some implementations. Referring to FIG. 4A, the communication module 202 receives 402 sensor data from one or more sensors coupled to the mobile client device 123. The state detection module 204 determines 404 an operation state of the mobile client device 123 based on the sensor data. The transfer module 206 determines 406 whether the operation state is a normal operation state. If the operation state is the normal operation state, the method 400 moves to block 408. Otherwise, the method 400 moves to block 410. At block 408, the transfer module 206 determines digital data to transfer to the mobile client device in the normal operation state.

At block 410, the transfer module 206 determines whether the operation state is a battery-restricted state. If the operation state is the battery-restricted state, the method 400 moves to block 412. Otherwise, the method 400 moves to block 416. At block 412, the transfer module 206 determines a battery level of a battery associated with the mobile client device 123. The transfer module 206 determines 414 digital data to transmit to the mobile client device 123 in the battery-restricted state based on the battery level. At block 416, the transfer module 206 detects an error. For example, the transfer module 206 may determine that the operation state of the mobile client device 123 is unrecognizable.

Figure 4B:
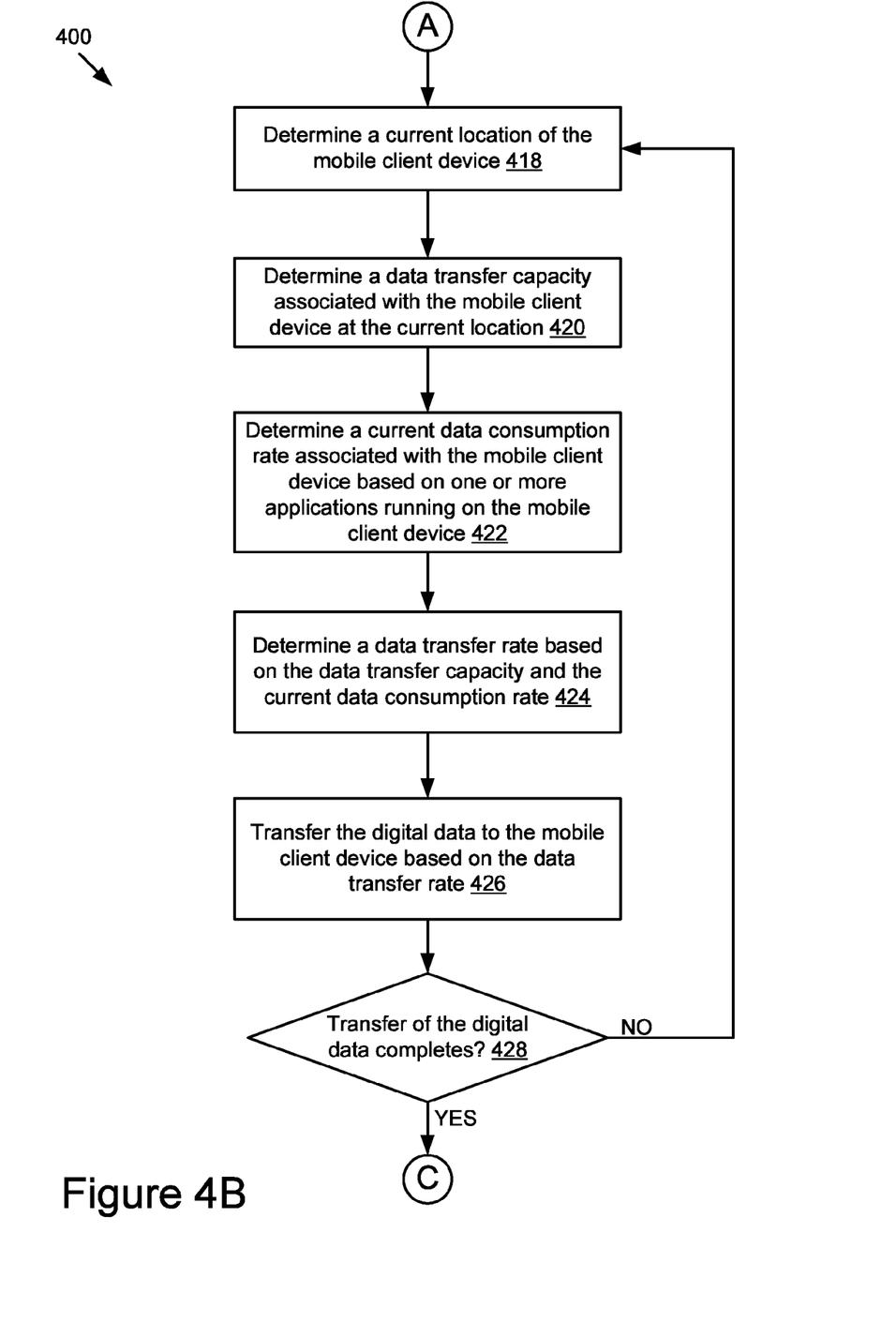

Referring to FIG. 4B, the transfer module 206 determines 418 a current location of the mobile client device 123. The transfer module 206 determines 420 a data transfer capacity associated with the mobile client device 123 at the current location. The transfer module 206 determines 422 a current data consumption rate associated with the mobile client device 123 based on one or more applications running on the mobile client device 123. For example, the current data consumption rate may include a total data rate describing a total amount of network data consumed by the one or more running applications per second. The transfer module 206 determines 424 a data transfer rate based on the data transfer capacity and the current data consumption rate.

The transfer module 206 transfers 426 the digital data to the mobile client device 123 based on the data transfer rate. The transfer module 206 determines 428 whether the transfer of the digital data completes. If the transfer of the digital data completes, the method 400 moves to block 430 in FIG. 4C. Otherwise, the method 400 moves to block 418. For example, the mobile client device 123 may travel at a certain speed. The location of the mobile client device 123 may change while the transfer module 206 transfers the digital data to the mobile client device 123. The transfer module 206 may update the location, the data transfer capacity, the current data consumption rate, and the data transfer rate associated with the mobile client device 123. The transfer module 206 may use the updated data transfer rate to continue transferring the digital data to the mobile client device 123.

Figure 4C:
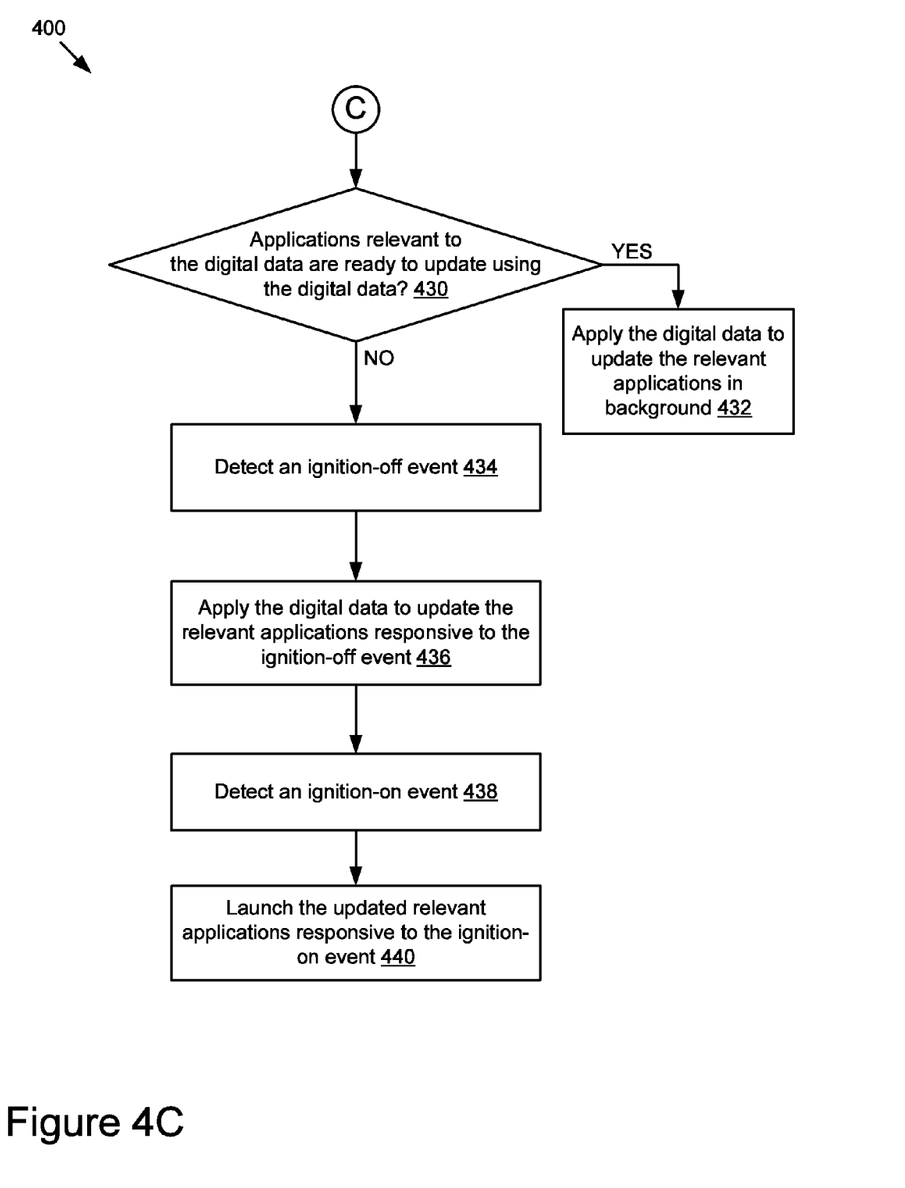

Referring to FIG. 4C, the update module 208 determines 430 whether one or more applications relevant to the digital data are ready to update using the digital data. If the one or more relevant applications are ready to update, the method 400 moves to block 432. Otherwise, the method 400 moves to block 434. At block 432, the update module 208 applies the digital data to update the one or more relevant applications in background without interfering with one or more other applications currently running on the mobile client device 123.

At block 434, the update module 208 detects an ignition-off event. The update module 208 applies 436 the digital data to update the one or more relevant applications responsive to the ignition-off event. For example, the update module 208 may update the one or more relevant applications in a vehicle when a driver turns off an ignition key in the vehicle. The update module 208 may detect 438 an ignition-on event. The update module 208 may launch 440 the one or more updated relevant applications using the digital data responsive to the ignition-on event. For example, when the driver turns on the ignition key in the vehicle, the one or more updated relevant applications may be launched responsive to the ignition-on event or a user request.

Figure 4D:
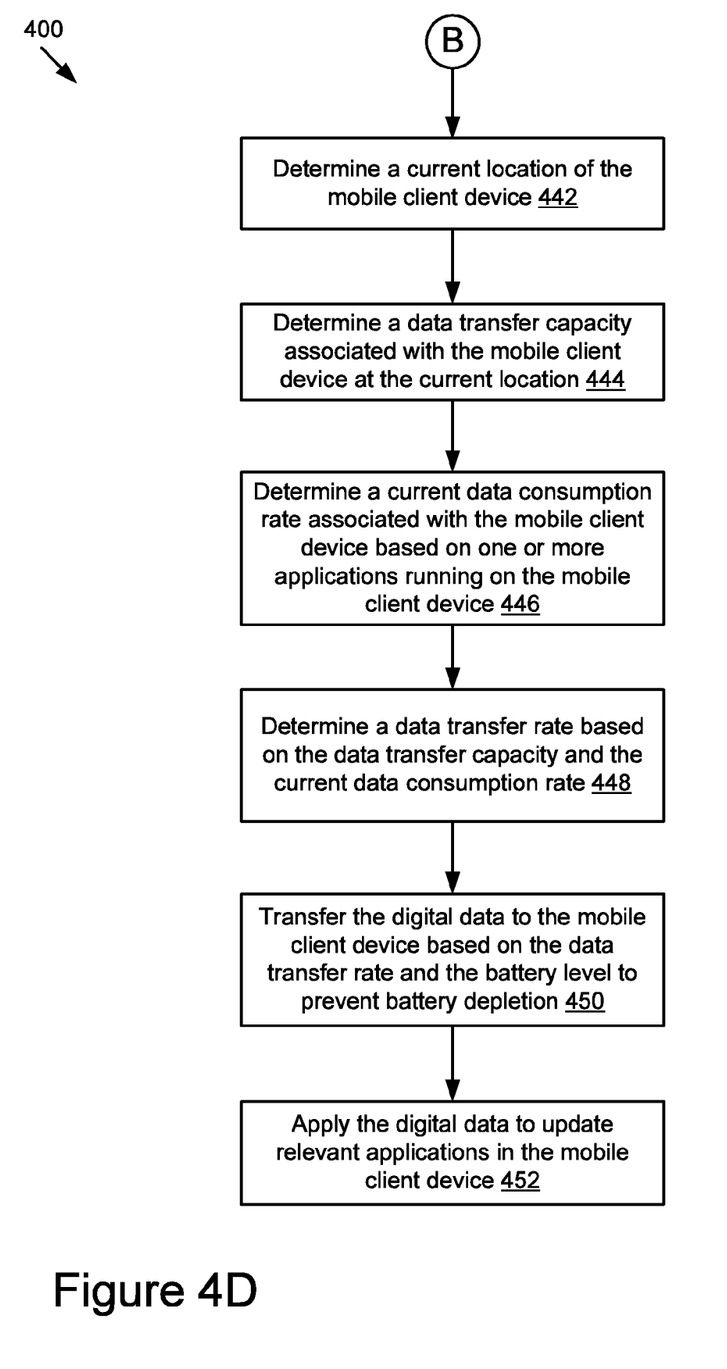

Referring to FIG. 4D, the transfer module 206 determines 442 a current location of the mobile client device 123 in the battery-restricted state such as an ignition-off state. The transfer module 206 determines 444 a data transfer capacity associated with the mobile client device 123 at the current location. The transfer module 206 determines 446 a current data consumption rate associated with the mobile client device 123 based on one or more applications currently running on the mobile client device 123. The transfer module 206 determines 448 a data transfer rate based on the data transfer capacity and the current data consumption rate. The transfer module 206 transfers 450 the digital data to the mobile client device 123 based on the data transfer rate and the battery level of the mobile client device 123 to prevent battery depletion in the battery-restricted state.

The update module 212 applies 452 the digital data to update one or more applications relevant to the digital data in the mobile client device 123 based on the battery level so that the battery maintains sufficient power for reliably restarting the mobile client device 123. For example, if the mobile client device 123 is in the battery-restricted state and the battery level is less than 50% full, the update module 212 may not update the one or more relevant applications in order to save power in the battery. The update module 212 may update the one or more relevant applications responsive to detecting an ignition-on event, which indicates the mobile client device 123 enters the normal operation state from the battery-restricted state.

In the above description, for purposes of explanation, numerous specific details are set forth in order to provide a thorough understanding of the disclosure. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computing device that can receive data and commands, and any peripheral devices providing services.

Reference in the disclosure to "some implementations" or "some instances" means that a particular feature, structure, or characteristic described in connection with the implementations or instances can be included in at least one implementation of the description. The appearances of the phrase "in some implementations" in various places in the disclosure are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the disclosure can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The disclosure can take the form of some entirely hardware implementations, some entirely software implementations or some implementations containing both hardware and software elements. In some preferred implementations, the disclosure is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosure is not described with reference to any particular programming language. It will be appreciated that a variety of programming languages may be used to implement the teachings of the disclosure as described herein.

The foregoing description of the implementations of the disclosure has been presented for the purposes of illustration and description. It is not intended to be exhaustive or to limit the disclosure to the precise form disclosed. Many modifications and variations are possible in light of the above teaching. It is intended that the scope of the disclosure be limited not by this detailed description, but rather by the claims of this application. As will be understood by those familiar with the art, the disclosure may be embodied in other specific forms without departing from the spirit or essential characteristics thereof. Likewise, the particular naming and division of the modules, routines, features, attributes, methodologies, and other aspects are not mandatory or significant, and the mechanisms that implement the disclosure or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the disclosure is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the disclosure, which is set forth in the following claims.

What is claimed is:

1. A method comprising:
   determining, by a processor, an operation state of a vehicle by determining a battery level associated with a battery of the vehicle and a threshold for the battery level which must be maintained so that the battery maintains a sufficient charge to start the vehicle, wherein the operation state includes a battery-restricted state;
   determining digital data to transmit to the vehicle based on the operation state;
   determining a location associated with the vehicle;
   determining a data transfer capacity associated with the vehicle at the location;
   determining a data consumption rate associated with the vehicle;
   determining a data transfer rate for the vehicle based on the data transfer capacity and the data consumption rate, wherein the data transfer rate is configured so that the battery of the vehicle maintains the sufficient charge to start the vehicle after the digital data is transferred to the vehicle; and
   transferring the digital data to the vehicle based on the operation state, and the data transfer rate, and the battery level so that the threshold is maintained and the battery of the vehicle maintains the sufficient charge to start the vehicle after the digital data is transferred to the vehicle.

2. The method of claim 1, wherein the operation state is determined from sensor data received from one or more sensors associated with the vehicle.

3. The method of claim 1, further comprising applying the digital data to update one or more applications related to the digital data in a background in the battery-restricted state of the vehicle.

4. The method of claim 1, further comprising:
   detecting an ignition-off event;
   applying the digital data to update one or more applications related to the digital data responsive to the ignition-off event;
   detecting an ignition-on event; and
   launching the one or more updated applications responsive to the ignition-on event.

5. The method of claim 1, wherein the data consumption rate includes a total data rate consumed by one or more applications that are launched on the vehicle.

6. A computer program product comprising a non-transitory computer-usable medium including a computer-readable program, wherein the computer-readable program when executed on a computer of a vehicle causes the computer to:
   determine an operation state of the vehicle by determining a battery level associated with a battery of the vehicle and a threshold for the battery level which must be maintained so that the battery maintains a sufficient charge to start the vehicle, wherein the operation state includes a battery-restricted state;
   determine digital data to transmit to the vehicle based on the operation state;
   determine a location associated with the vehicle;
   determine a data transfer capacity associated with the vehicle at the location;
   determine a data consumption rate associated with the vehicle;
   determine a data transfer rate for the vehicle based on the data transfer capacity and the data consumption rate, wherein the data transfer rate is configured so that a battery of the vehicle maintains a sufficient charge to start the vehicle after the digital data is transferred to the vehicle; and
   transfer the digital data to the vehicle based on the operation state, the data transfer rate, and the battery level so that the threshold is maintained and the battery of the vehicle maintains the sufficient charge to start the vehicle after the digital data is transferred to the vehicle.

7. The computer program product of claim 6, wherein determining the digital data to transmit to the vehicle is further based on journey context data that indicates a time that a user may take a journey in the vehicle.

8. The computer program product of claim 6, wherein the computer-readable program when executed on the computer further causes the computer to apply the digital data to update one or more applications related to the digital data in a background in the battery-restricted state of the vehicle.

9. The computer program product of claim 6, wherein the computer-readable program when executed on the computer further causes the computer to:
   detect an ignition-off event;
   apply the digital data to update one or more applications related to the digital data responsive to the ignition-off event;
   detect an ignition-on event; and
   launch the one or more updated applications responsive to the ignition-on event.

10. The computer program product of claim 6, wherein the data consumption rate includes a total data rate consumed by one or more applications that are launched on the vehicle.

11. A system comprising:
    one or more processors;
    one or more non-transitory tangible computer readable mediums communicatively coupled to the one or more processors and storing executable instructions executable by the one or more processors to perform operations comprising:
       determining an operation state of a vehicle by determining a battery level associated with a battery of the vehicle and a threshold for the battery level which must be maintained so that the battery maintains a sufficient charge to start the vehicle, wherein the operation state includes a battery-restricted state;
       determining digital data to transmit to the vehicle based on the operation state;
       determining a location associated with the vehicle;
       determining a data transfer capacity associated with the vehicle at the location;

determining a data consumption rate associated with the vehicle;

determining a data transfer rate for the vehicle based on the data transfer capacity and the data consumption rate, wherein the data transfer rate is configured so that a battery of the vehicle maintains a sufficient charge to start the vehicle after the digital data is transferred to the vehicle; and transferring the digital data to the vehicle based on the operation state, the data transfer rate, and the battery level so that the threshold is maintained and the battery of the vehicle maintains the sufficient charge to start the vehicle after the digital data is transferred to the vehicle.

12. The system of claim 11, wherein the instructions executable by the one or more processors perform operations further comprising selecting a wireless network from multiple wireless networks based on at least one of a connectivity of the wireless networks, data transfer costs related to the wireless networks, and the operation state of the vehicle.

13. The system of claim 11, wherein the instructions executable by the one or more processors perform operations further comprising applying the digital data to update one or more applications related to the digital data in a background in the battery-restricted state of the vehicle.

14. The system of claim 11, wherein the instructions executable by the one or more processors perform operations further comprising:

detecting an ignition-off event;

applying the digital data to update one or more applications related to the digital data responsive to the ignition-off event;

detecting an ignition-on event; and launching the one or more updated applications responsive to the ignition-on event.

\* \* \* \* \*